(12) United States Patent
Terai et al.

(10) Patent No.: US 11,663,069 B2
(45) Date of Patent: May 30, 2023

(54) PROCESSING SYSTEM, SENSOR SYSTEM, MOBILE OBJECT, ABNORMALITY DETERMINATION METHOD, AND NON-TRANSITORY STORAGE MEDIUM

(71) Applicant: Panasonic Intellectual Property Management Co., Ltd., Osaka (JP)

(72) Inventors: Haruko Terai, Osaka (JP); Gentaro Takeda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 367 days.

(21) Appl. No.: 17/002,396

(22) Filed: Aug. 25, 2020

(65) Prior Publication Data
US 2020/0387420 A1    Dec. 10, 2020

Related U.S. Application Data

(63) Continuation of application No. PCT/JP2019/037076, filed on Sep. 20, 2019.

(30) Foreign Application Priority Data

Sep. 25, 2018    (JP) .............................. JP2018-179431

(51) Int. Cl.
*H04N 17/00*    (2006.01)
*H04N 17/02*    (2006.01)
(Continued)

(52) U.S. Cl.
CPC ........ *G06F 11/079* (2013.01); *G06F 11/0724* (2013.01); *G06F 11/0751* (2013.01); *H04N 17/002* (2013.01); *H04N 23/80* (2023.01)

(58) Field of Classification Search
CPC .............. G06F 11/079; G06F 11/0724; G06F 11/0751; H04N 5/23229; H04N 17/002
(Continued)

(56) References Cited

U.S. PATENT DOCUMENTS 6,530,046 B1    3/2003  Hasegawa et al.
7,890,227 B2 *  2/2011  Sayama ................. H02J 9/061
                                                       701/1
(Continued)

FOREIGN PATENT DOCUMENTS

JP    2000-243916    9/2000
JP    2003-098225    4/2003
(Continued)

OTHER PUBLICATIONS

Japanese Office Action dated Mar. 9, 2021 issued in Japanese patent application No. 2018-179431 along with corresponding English translation.
(Continued)

*Primary Examiner* — Trang U Tran
(74) *Attorney, Agent, or Firm* — Greenblum & Bernstein, P.L.C.

(57)    ABSTRACT

A processing system sets up two or more circuits of a plurality of circuits as two or more processing circuits. The two or more processing circuits subject respective input signals from a sensor to signal processing. The processing system sets up at least one circuit of the plurality of circuits to serve as a reference circuit. The at least one circuit being smaller in number than the two or more processing circuits and being other than the processing circuits. The determination circuit is configured to perform abnormality determination for a determination target circuit which is any one of the two or more processing circuits based on a compari-
(Continued)

son result between an output signal of the determination target circuit and an output signal of the reference circuit.

14 Claims, 6 Drawing Sheets

(51) Int. Cl.
 *G06F 11/07* (2006.01)
 *H04N 23/80* (2023.01)
(58) Field of Classification Search
 USPC .......................................................... 348/175
 See application file for complete search history.

(56) References Cited

U.S. PATENT DOCUMENTS

| | | | |
|---|---|---|---|
| 8,095,257 B2* | 1/2012 | Kondoh | ................... F02D 41/22 701/31.7 |
| 2003/0061555 A1 | 3/2003 | Kamei et al. | |
| 2011/0254822 A1 | 10/2011 | Anzai et al. | |
| 2015/0293173 A1 | 10/2015 | Tsuboi et al. | |
| 2017/0026594 A1 | 1/2017 | Shida et al. | |
| 2018/0080984 A1 | 3/2018 | Tsuboi et al. | |

FOREIGN PATENT DOCUMENTS

| | | |
|---|---|---|
| JP | 2009-111546 | 5/2009 |
| JP | 2009-128532 | 6/2009 |
| JP | 2010-060498 | 3/2010 |
| JP | 2010-124216 | 6/2010 |
| JP | 2010-128324 | 6/2010 |
| JP | 2015-206785 | 11/2015 |
| JP | 2016-157247 | 9/2016 |
| JP | 2017-028490 | 2/2017 |
| JP | 2020-46974 | 3/2020 |

OTHER PUBLICATIONS

Official Communication issued in International Patent Application No. PCT/JP2019/037076, dated Dec. 17, 2019, along with an English translation thereof.

* cited by examiner

PROCESSING SYSTEM, SENSOR SYSTEM, MOBILE OBJECT, ABNORMALITY DETERMINATION METHOD, AND NON-TRANSITORY STORAGE MEDIUM

CROSS-REFERENCE TO RELATED APPLICATION

The present application is and a continuation application of international application No. PCT/JP2019/037076, filed Sep. 20, 2019, which claims the benefit of priority to Japanese Patent Application No. 2018-179431, filed on Sep. 25, 2018. The contents of these applications are incorporated herein by reference in their entirety.

TECHNICAL FIELD

The present disclosure relates to processing systems, sensor systems, mobile bodies, abnormality determination methods, and non-transitory storage media. Specifically, the present disclosure relates to a processing system, a sensor system, a mobile object, an abnormality determination method, and a non-transitory storage medium in which a program is stored, the program being configured to subject the input signal from a sensor to signal processing.

BACKGROUND ART

An image capturing sensor (processing system) is known which includes an image synthesizer configured to output a synthetic image synthesized by combining first image information obtained by a pixel array with a first exposure time with second image information obtained by the pixel array with a second exposure time (see, for example, JP 2017-28490).

SUMMARY

An object of the present disclosure is to provide a processing system, a sensor system, a mobile object, an abnormality determination method, and a non-transitory storage medium storing a program which are configured to monitor the presence or absence of a failure while enlargement of a circuit scale is suppressed.

A processing system of one aspect of the present disclosure includes a plurality of circuits each configured to receive an input signal from a sensor; and a determination circuit. The processing system is configured to set up two or more circuits of the plurality of circuits to serve as two or more processing circuits each configured to subject the input signal to signal processing. The processing system is configured to set up at least one circuit of the plurality of circuits to serve as a reference circuit. The at least one circuit is smaller in number than the two or more processing circuits and is other than the two or more processing circuits. The determination circuit is configured to, based on a comparison result between an output signal of the determination target circuit and an output signal of the reference circuit, perform abnormality determination to determine whether or not a determination target circuit has an abnormality. The determination target circuit is any one of the two or more processing circuits.

A sensor system of one aspect of the present disclosure includes the processing system and the sensor.

A mobile object of one aspect of the present disclosure includes the sensor system and a mobile object body on which the sensor system is provided.

An abnormality determination method of one aspect of the present disclosure includes setting up two or more circuits of a plurality of circuits to serve as two or more processing circuits. Each of the plurality of circuits is configured to receive an input signal from a sensor. Each of the two or more processing circuits is configured to subject the input signal to signal processing. The abnormality determination method of the one aspect includes setting up at least one circuit of the plurality of circuits to serve as a reference circuit. The at least one circuit is smaller in number than the two or more processing circuits and is other than the two or more processing circuits. The abnormality determination method of the one aspect includes performing abnormality determination to determine whether or not a determination target circuit has an abnormality, the determination target circuit being any one of the two or more processing circuits based on a comparison result between an output signal of the determination target circuit and an output signal of the reference circuit.

A non-transitory storage medium of one aspect of the present disclosure is a non-transitory storage medium in which a program is stored, the program being configured to cause a computer system to execute the abnormality determination method.

BRIEF DESCRIPTION OF THE DRAWINGS

The figures depict one or more implementation in accordance with the present teaching, by way of example only, not by way of limitations. In the figures, like reference numerals refer to the same or similar elements.

DETAILED DESCRIPTION (Embodiment)
(1) Schema

Figure 1:
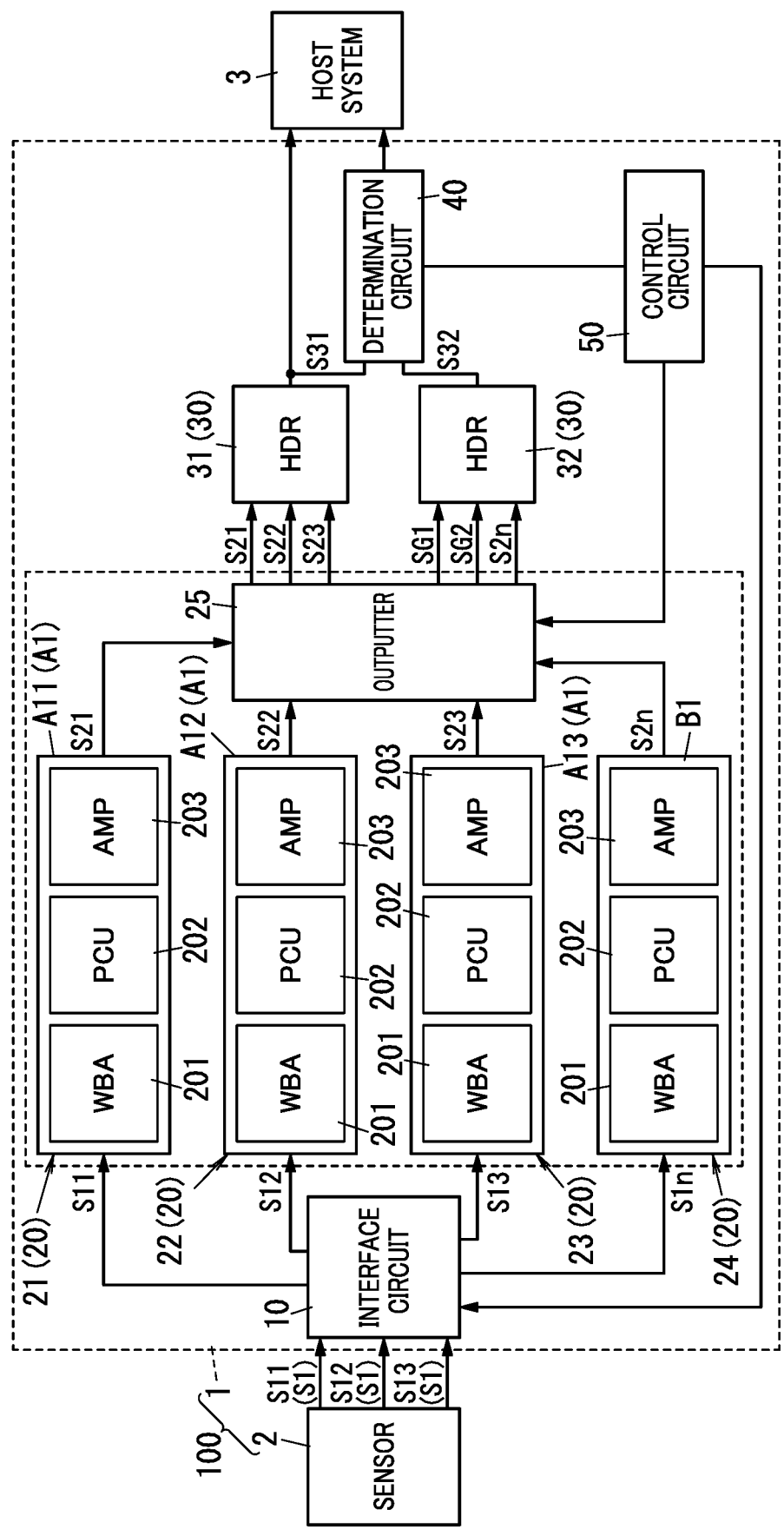
FIG. 1 is a block diagram of a sensor system including a processing system according to one embodiment of the present disclosure.

As illustrated in FIG. 1, a processing system 1 of the present embodiment includes: a plurality of circuits 20 each configured to receive an input signal S1 from a sensor 2; and a determination circuit 40.

The processing system 1 sets up two or more circuits 20 of the plurality of circuits 20 to serve as two or more processing circuits A1 each configured to subject the input signal S1 to signal processing.

The processing system 1 sets up at least one circuit 20 of the plurality of circuits 20 to serve as a reference circuit B1. The at least one circuit 20 is smaller in number than the two or more processing circuits A1 and is other than the two or more processing circuits A1.

The determination circuit 40 is configured to perform abnormality determination to determine, based on a comparison result between an output signal of the determination target circuit and an output signal of the reference circuit B1, whether or not a determination target circuit has an abnormality, the determination target circuit being any one of the two or more processing circuits A1.

In this embodiment, the comparison result between the output signal of the determination target circuit and the output signal of the reference circuit B1 is not limited to a comparison result resulting from a comparison between the output signal itself of the determination target circuit and the output signal itself of the reference circuit B1. For example, the determination circuit 40 may perform the abnormality determination to determine whether or not the determination target circuit has an abnormality based on a result of comparison between an output signal in a case where the output signal of the determination target circuit is input to a processor configured to subject a received signal to a predetermined process and an output signal in a case where the output signal of the reference circuit B1 is input to the processor. Examples of the processor include a High Dynamic Range (HDR) rendering circuit configured to combine a plurality of pieces of image data with different exposure times with each other and a filter circuit configured to reduce prescribed components contained in the input signal. Here, the processor to which the output signal of the determination target circuit is input and the processor to which the output signal of the reference circuit B1 is input may be an identical circuit or may be different circuits having the same functions.

For example, when the image capturing sensor (processing system) disclosed in JP 2018-179431 is used in an in-vehicle electronic system, a function of monitoring the presence or absence of a failure in the image capturing sensor is required because the in-vehicle electronic system requires a high degree of safety.

Here, when the entirety of the processing system is duplicated, and outputs of the duplicated processing systems are compared with each other to monitor the presence or absence of a failure, a circuit scale increases since the entirety of the processing system is duplicated.

In the present embodiment, since the determination circuit 40 performs the abnormality determination for any one of the two or more processing circuits A1 which is set up to serve as the determination target circuit, changing the determination target circuit between the two or more processing circuits A1 enables the abnormality determination to be performed on all the processing circuits A1. Since the at least one reference circuit B1 is fewer than the two or more processing circuits A1, the enlargement of the circuit scale is suppressible as compared to a case where the same number of reference circuits as the two or more processing circuits A1 are provided to subject the two or more processing circuits A1 to the abnormality determination. This enables the processing system 1 of the present embodiment to monitor the presence or absence of a failure while the enlargement of the circuit scale is suppressed.

(2) Details

The processing system 1 of the present embodiment and a sensor system 100 including the processing system 1 will be described in detail below with reference to the drawings.

Figure 2:
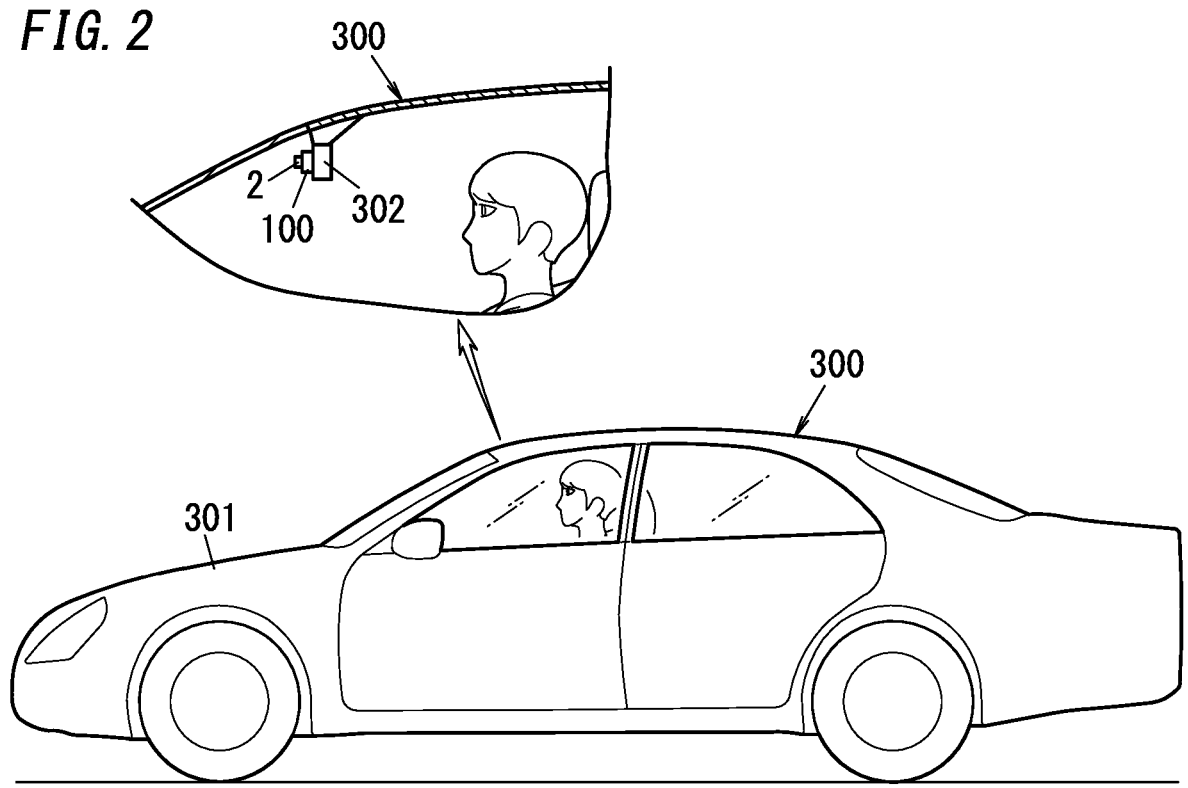
FIG. 2 is a view illustrating a mobile object on which the sensor system is provided.

The processing system 1 and the sensor system 100 are provided on, for example, a mobile object. FIG. 2 shows an automobile 300 as the mobile object. The automobile 300 includes the sensor system 100 and a vehicle body 301 as a mobile object body on which the sensor system 100 is provided.

The sensor system 100 of the present embodiment is configured to process the input signals S1, for example, from the sensor 2 such as an image sensor. The sensor system 100 is attached to, for example, a rearview mirror 302 installed in a vehicle interior of the automobile 300, and the sensor 2 captures a scene ahead of the automobile 300. The sensor system 100 performs signal processing on the input signals S1, which include pieces of image data output from the sensor 2, and the sensor system 100 then outputs the input signals S1 to a host system 3 (see FIG. 1). The host system 3 is, for example, an Electronic Control Unit (ECU) provided on the automobile 300. Based on the image data from the sensor 2, the host system 3 performs processes and the like such as detecting obstacles around the automobile 300 and controlling a braking device of the automobile 300.

(2.1) Processing System

The processing system 1 includes an interface circuit 10, the plurality of (in the present embodiment, for example, four) circuits 20, an HDR rendering circuit 30 serving as the processor, the determination circuit 40, and a control circuit 50. The processing system 1 further includes an outputter 25. In the present embodiment, the processing system 1 includes, for example, four circuits 20. When the circuits 20 are individually distinguished from one another in the following description, the circuits 20 may be denoted as circuits 21, 22, 23, and 24. Moreover, in the present embodiment, three circuits 21, 22, and 23 of the four circuits 20 are set up to serve as processing circuits A1. When the processing circuits A1 are individually distinguished from one another in the description, the processing circuits A1 may be denoted as processing circuits A11, A12, and A13. Furthermore, the present embodiment includes two HDR rendering circuits 30. When the HDR rendering circuits 30 are individually distinguished from each other in the following description, the HDR rendering circuits 30 may be denoted as HDR rendering circuits 31 and 32.

The processing system 1 of the present embodiment processes the input signals S1, for example, from the sensor 2. The sensor 2 of the present embodiment is, for example, an image sensor such gas a Complementary Metal Oxide Semiconductor (CMOS) image sensor or a Charge Coupled Device (CCD) image sensor. In the present embodiment, the input signals S1 from the sensor 2 include pieces of image data. Specifically, two or more (in the present embodiment, for example, three) input signals S1 input from the sensor 2 to respective two or more (in the present embodiment, for example, three) processing circuits A1 include pieces of image data with different exposure times. When the plurality of input signals from the sensor 2 are distinguished from each other in the following description, the input signals may be denoted as input signals S11, S12, and S13. Here, of the three input signals S11, S12, and S13 from the sensor 2, the input signal S11 corresponds to the longest exposure time, and the input signal S13 corresponds to the shortest exposure time. Note that the input signals S11, S12, and S13 from the sensor 2 include pieces of image data of, for example, color images but may include pieces of image data of monochrome images.

As described above, the sensor 2 is an image sensor, and the processing system 1 of the present embodiment is realized by, for example, an Image Signal Processor (ISP). That is, the processing system 1 includes, as a main component, a microcontroller including one or more processors and one or more memories. The one or more processors of the microcontroller execute one or more programs stored in the one or more memories of the microcontroller, thereby realizing functions of the processing system 1. The one or more programs may be stored in the one or more memories, provided via a telecommunications network such as the Internet, or provided by a non-transitory storage medium such as a memory card storing the one or more programs.

The control circuit 50 controls overall operation of the processing system 1.

The input signals S11 to S13 from the sensor 2 are input to the interface circuit 10. The interface circuit 10 outputs the input signals S11 to S13 from the sensor 2 to the plurality of circuits 21 to 24. Specifically, the interface circuit 10 receives the input signals S1 from the sensor 2 and outputs each of the input signals S1 to a corresponding one of the plurality of circuits 20. The interface circuit 10 outputs, to the reference circuit B1, an input signal S1 the same as the input signal S1 input to the determination target circuit.

The processing system 1 of the present embodiment sets up the same number of (i.e., three) circuits 21, 22, and 23 of the plurality of circuits 21 to 24 as the input signals S11 to S13 to respectively serve as the processing circuits A11, A12, and A13 configured to subject the input signals S11, S12, and S13 respectively to signal processing. Moreover, the processing system 1 sets up the circuit 24 of the plurality of circuits 21 to 24 which is other than the processing circuits A11, A12, and A13 to serve as the reference circuit B1. That is, the number of the reference circuit B1 is one and is smaller than the number of processing circuits A11, A12, and A13. Thus, the interface circuit 10 outputs the input signal S11, the input signal S12, and the input signal S13 from the sensor 2 respectively to the processing circuit A11, the processing circuit A12, and the processing circuit A13. Moreover, the interface circuit 10 outputs, to the reference circuit B1, the input signal S1 the same as the input signal S1 input to the determination target circuit (any one of the processing circuits A11, A12, and A13). That is, an input signal S1n input to the reference circuit B1 is the same signal as the input signal S1 input to the processing circuit A1 of the processing circuits A11, A12, and A13 which is set up to serve as the determination target circuit. For example, when the determination target circuit is the processing circuit A11, the interface circuit 10 outputs, to the reference circuit B1, an input signal the same as the input signal S11 input to the processing circuit A11, and thus, the input signal S1n input to the reference circuit B1 corresponds to the input signal S11 input to the processing circuit A11. In the present embodiment, the determination target circuit which is subjected to the abnormality determination performed by the determination circuit 40 is changed from one processing circuit of the two or more processing circuits A1 (in the present embodiment, three processing circuits A11 to A13) to another processing circuit of the two or more processing circuits A1 over time. The control circuit 50 of the processing system 1 changes the input signal S1n to be input to the reference circuit B1 over time, thereby changing the determination target circuit from one processing circuit of the two or more processing circuits A1 to another processing circuit of the two or more processing circuits A1 over time.

The plurality of circuits 20 (the processing circuits A11 to A13 and the reference circuit B1) have the same circuit configurations. Since the plurality of circuits 21 to 24 have the same circuit configurations, the circuit configuration of the circuit 21 will be described as an example, and the description of the circuit configurations of the other circuits 22 to 24 will be omitted below. In the present embodiment, the processing system 1 is realized by an image signal processor, and each of the plurality of circuits 20 is realized by a program executed by the image signal processor. Note that saying that the plurality of circuits 20 have the same circuit configurations is not limited to that the plurality of circuits 20 have exactly the same circuit configurations. As long as main circuit components that realize functions of the circuits 20 are the same, some components may differ among the circuits 20.

The circuit 21 includes a white balance adjuster 201, a pixel corrector 202, and an amplifier 203. Note that in FIG. 1 and other figures, the white balance adjuster 201 is denoted by the abbreviation "WBA", the pixel corrector 202 is denoted by the abbreviation "PCU", and the amplifier 203 is denoted by the abbreviation "AMP". The control circuit 50 of the processing system 1 sets parameters regarding the signal processing on the input signal S1 in each of the plurality of circuits 20. In this embodiment, the parameters are adjustment values and the like of the white balance adjuster 201, the pixel corrector 202, the amplifier 203, and the like. The control circuit 50 of the processing system 1 sets the parameters according to the input signal S1 to be processed in each of the plurality of circuits 20, which enables each of the plurality of circuits 20 to perform signal processing according to the input signal S1 to be processed. In the present embodiment, the input signals S11, S12, and S13 include pieces of image data with different exposure times, and therefore, parameters according to the exposure time of each of the input signals S11, S12, and S13 to be input are set in a corresponding one of the plurality of circuits 20. That is, the parameters regarding the signal processing on the input signal S1 are set in each of the plurality of circuits 20. The determination target circuit is changed in accordance with a change in the parameters set in the reference circuit B1 (specifically, the circuit 24 serving as the reference circuit B1). Specifically, the control circuit 50 of the processing system 1 sets, in the reference circuit B1, the same parameters as those set in the determination target circuit and causes the interface circuit 10 to output, to the reference circuit B1, the input signal S1 the same as that input to the determination target circuit, thereby changing the determination target circuit.

The white balance adjuster 201 of the circuit 21 corrects a pixel value of the input signal S11 input via the interface circuit 10 from the sensor 2, thereby adjusting the white balance of the input signal S11 serving as the image data. Methods for adjusting the white balance are known, and thus, the detailed description thereof is omitted.

The pixel corrector 202 of the circuit 21 performs, for example, based on a pixel value of each pixel of the input signal S11 serving as the image data, a process such as correcting a pixel value of a defective pixel whose pixel value is an abnormal value with reference to pixel values of neighboring pixels of the defective pixel.

The amplifier 203 performs, for example, a process such as amplifying a pixel value of each pixel of the input signal S11 serving as the image data.

As described above, each of the plurality of circuits 20 includes the white balance adjuster 201, the pixel corrector 202, and the amplifier 203 and performs prescribed signal processing on the input signal S1 input via the interface circuit 10 from the sensor 2. The circuit 20 outputs, to the outputter 25, a signal (image data) obtained by performing the prescribed signal processing on the input signal S1. Note that process contents of the signal processing performed by each circuit 20 are mere examples, and the process contents of the signal processing performed by each circuit 20 are accordingly changeable.

The outputter 25 outputs, to the HDR rendering circuits 31 and 32, pieces of image data S21, S22, S23, and S2n after signal processing respectively performed by the plurality of circuits 21, 22, 23, and 24 (i.e., the processing circuits A11, A12, and A13 and the reference circuit B1). Specifically, the outputter 25 outputs, to the HDR rendering circuit 31, the pieces of image data S21, S22, and S23 after the signal processing respectively performed by the processing circuits A11, A12, and A13. Moreover, the control circuit 50 of the processing system 1 controls the outputter 25 to cause the outputter 25 to output the image data S2n after the signal processing performed by the reference circuit B1 and two pieces of image data SG1 and SG2 to the HDR rendering circuit 32. Here, the two pieces of image data SG1 and SG2 include pieces of image data after the signal processing performed by two processing circuits of the three processing circuits A11 to A13 other than the determination target circuit. Note that the outputter 25 is not an essential component but may be accordingly omitted.

Each HDR rendering circuit 30 combines output signals (pieces of image data) output from the two or more processing circuits A1 with each other. Specifically, each HDR rendering circuit 30 combines a plurality of pieces of image data with different exposure times with each other to synthesize image data with wider dynamic range than each of the plurality of pieces of image data.

The processing system 1 of the present embodiment includes two HDR rendering circuits 31 and 32.

The three pieces of image data S21, S22, and S23 after signal processing respectively performed by the three processing circuits A11, A12, and A13 are input to the HDR rendering circuit 31 via the outputter 25. The HDR rendering circuit 31 combines the three pieces of image data S21, S22, and S23 with different exposure times with each other to synthesize image data S31 and outputs the image data S31 to the host system 3 and the determination circuit 40.

The three pieces of image data SG1, SG2, and S2n are input to the other HDR rendering circuit 32 via the outputter 25. The pieces of image data SG1 and SG2 include pieces of image data output from two processing circuits A1 of the three processing circuits A11, A12, and A13 other than the processing circuit A1 set up to serve as the determination target circuit. The image data S2n is image data output from the reference circuit B1. The HDR rendering circuit 32 combines the three pieces of image data SG1, SG2, and S2n with each other to synthesize image data S32 and outputs the image data S32 to the determination circuit 40.

For example, when the determination target circuit is the processing circuit A11, the outputter 25 outputs the pieces of image data S22 and S23, which are respectively output from the two processing circuits A12 and A13 other than the processing circuit A11, to the HDR rendering circuit 32 respectively as the pieces of image data SG1 and SG2. Moreover, when the determination target circuit is the processing circuit A11, the input signal S11 the same as the input signal input to the processing circuit A11 serving as the determination target circuit is input to the reference circuit B1, and the image data S2n obtained by the signal processing performed on the input signal S11 by the reference circuit B1 is input to the HDR rendering circuit 32. Thus, the HDR rendering circuit 32 receives the image data S2n obtained by performing the signal processing by the reference circuit B1 on the input signal S11 the same as the input signal input to the processing circuit A11 serving as the determination target circuit. The HDR rendering circuit 32 outputs the image data S32 synthesized by combining the pieces of image data S2n, S22, and S23.

Thus, image data after the signal processing performed by the determination target circuit on the input signal S1 from the sensor 2 is input to the HDR rendering circuit 31, and image data Sn after the signal processing performed by the reference circuit B1 on an input signal S1 the same as the input signal S1 input to the determination target circuit is input to the HDR rendering circuit 32. Thus, when the determination target circuit and the reference circuit B1 are normal, the pieces of image data output from the determination target circuit and the reference circuit B1 are the same, and the pieces of image data S31 and S32 output from the HDR rendering circuits 31 and 32 are thus the same. In contrast, when at least one of the determination target circuit or the reference circuit B1 is abnormal, the pieces of image data output from the determination target circuit and the reference circuit B1 are at least partially different from each other. Thus, when at least one of the determination target circuit or the reference circuit B1 is abnormal, the pieces of image data S31 and S32 respectively output from the HDR rendering circuits 31 and 32 are at least partially different from each other.

The determination circuit 40 performs a comparison between the image data S31 output from the HDR rendering circuit 31 and the image data S32 output from the HDR rendering circuit 32, and based on a result of the comparison, the determination circuit 40 determines the presence or absence of an abnormality in the determination target circuit. The determination circuit 40 outputs a result of the determination of the presence or absence of the abnormality in the determination target circuit to the host system 3 and the control circuit 50.

The determination circuit 40 performs a comparison of pixel values of pixels between the pieces of image data S31 and S32 of, for example, a two-dimensional image. When the pixel values of the pixels are equal to each other between the pieces of image data S31 and S32, outputs obtained when the same input signals S1 are input to the determination target circuit and the reference circuit B1 are the same, and therefore, the determination circuit 40 determines that the determination target circuit is normal. In contrast, when at least one of the pixel values of the pixels is different between the pieces of image data S31 and S32, outputs obtained when the same input signals S1 are input to the determination target circuit and the reference circuit B1 are different from each other, and therefore, the determination circuit 40 determines that the processing circuit A1 serving as the determination target circuit is abnormal. Moreover, while the determination circuit 40 changes the determination target circuit among the three processing circuits A11, A12, and A13 over time, the determination circuit 40 performs the abnormality determination for the determination target circuit. Then, when the determination circuit 40 determines that all of the three processing circuits A11, A12, and A13 are abnormal, the determination circuit 40 determines that the circuit 24 serving as the reference circuit B1, but not the processing circuits A11, A12, and A13, is abnormal. Note that the determination circuit 40 may subject the pieces of image data S31 and S32 of the two-dimensional image to error detection by using an error-detecting code such as Cyclic Redundancy Check (CRC) to determine whether or not the pieces of image data S31 and S32 are the same.

(2.2) Sensor System

The sensor system 100 includes the processing system 1 and the sensor 2.

The input signals S1 input from the sensor 2 to the processing system 1 include, for example, pieces of image data.

The sensor system 100 processes the input signals S1, such as pieces of image data, from the sensor 2 and outputs the input signals S1 to the host system 3. The image data S31 synthesized by the HDR rendering circuit 31 of the sensor system 100 is input to the host system 3, and the host system 3 may use the image data S31 processed in the sensor system 100 for control or the like of the automobile 300.

(2.3) Operation

Figure 3:
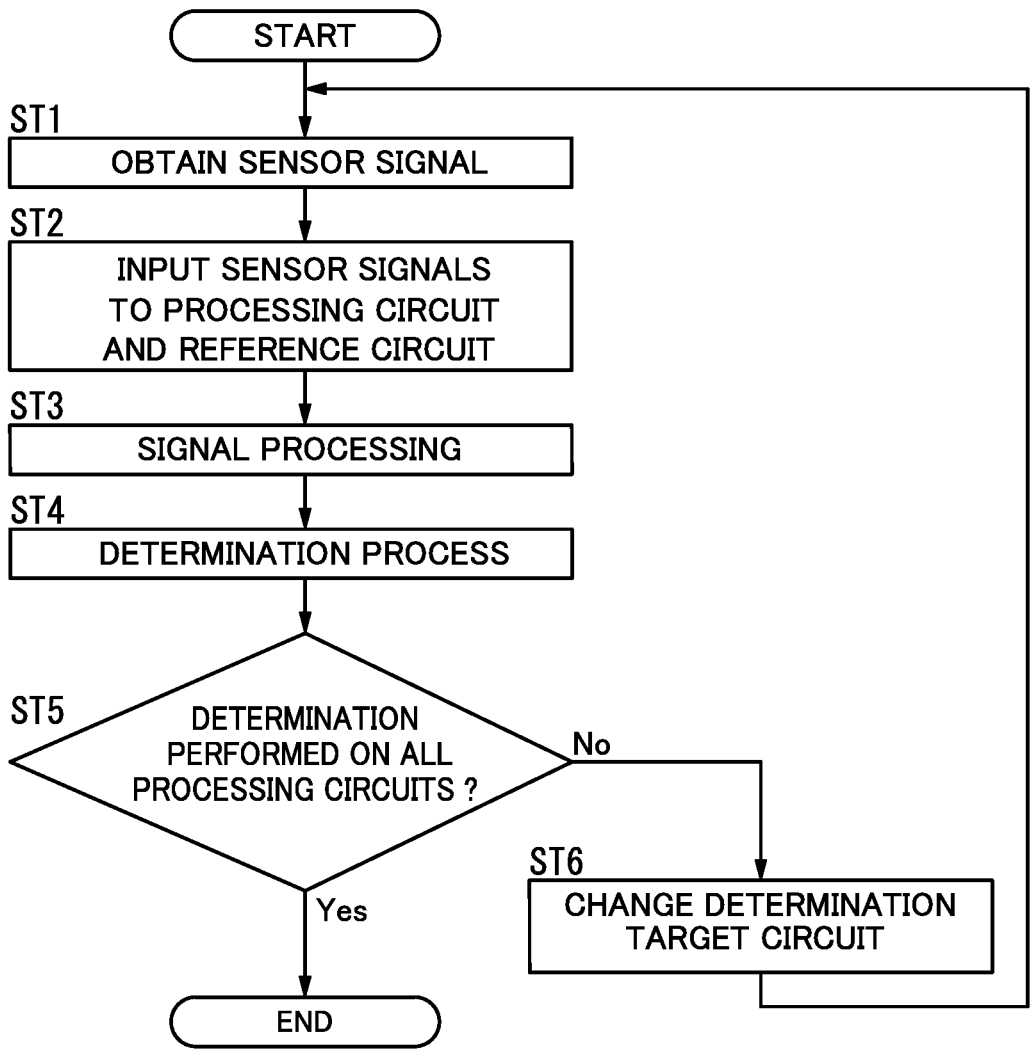
FIG. 3 is a flowchart illustrating operation of the sensor system.
Figure 4:
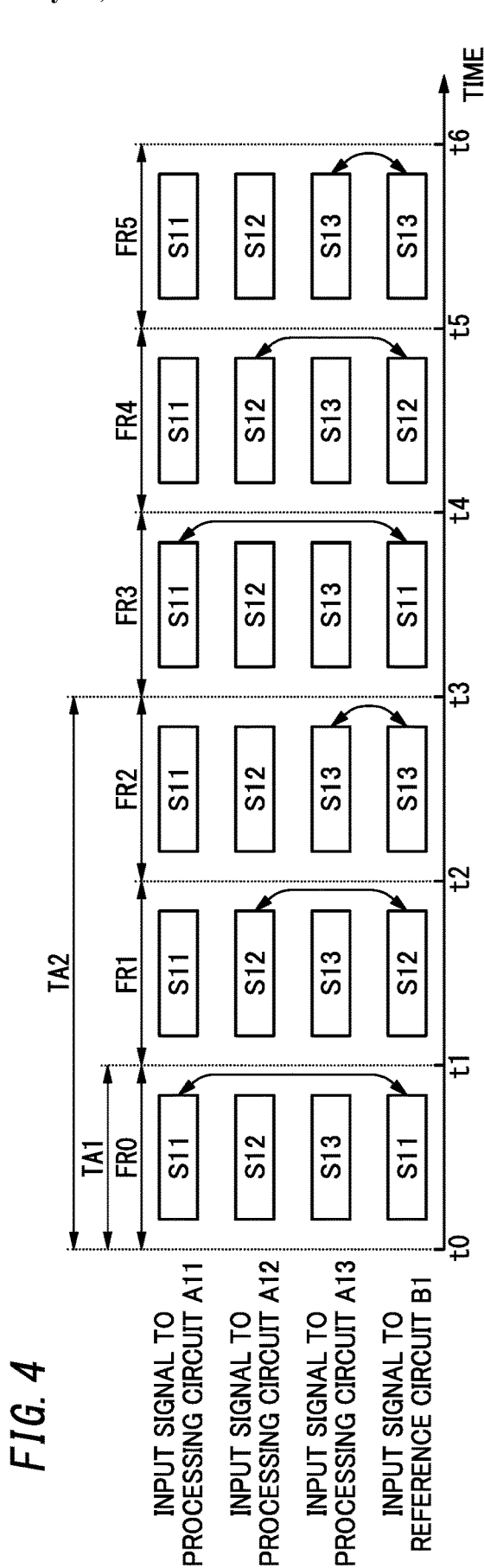
FIG. 4 is a timing chart illustrating the operation of the sensor system.

Operation of the processing system 1 and the sensor system 100 will be described with reference to FIGS. 3 and 4. FIG. 3 is a flowchart illustrating operation of the abnormality determination which is cycled through once the three processing circuits A11 to A13. FIG. 4 is a timing chart illustrating input signals input to the processing circuits A11 to A13 and the reference circuit B1.

The interface circuit 10 of the processing system 1 obtains the sensor signals (input signals S1) from the sensor 2 (ST1 in FIG. 3) in a prescribed cycle TA1 (e.g., at time intervals of 30 frames per second (fps)). In other words, the input signals S1 (S11 to S13) are input from the sensor 2 to the interface circuit 10 in each prescribed cycle TA1.

When the input signals S1 are input from the sensor 2 to the interface circuit 10 at time point t0, the interface circuit 10 receives the input signals S1 from the sensor 2 and outputs the input signals S1 to the processing circuit A11 to A13 and the reference circuit B1 (ST2 in FIG. 3). Here, the interface circuit 10 outputs the input signals S11, S12, and S13 respectively to the processing circuits A11, A12, and A13. Moreover, the interface circuit 10 receives the input signal S1 from the sensor 2 and outputs the input signal S1 to the determination target circuit in each of frames FR0 to FR5, to the reference circuit B1 as the input signal S1n. For example, in the frame FR0 from time points t0 to t1, the determination circuit 40 sets up the processing circuit A11 to serve as the determination target circuit, and therefore, the interface circuit 10 outputs, to the reference the B1, an input signal S11 the same as the input signal output to the processing circuit A11. Note that the determination circuit 40 changes the determination target circuit for each of the frames FR0 to FR5 and thus cyclically changes the determination target circuit in the order of the processing circuit A11→A12→A13→A11→ . . . . Therefore, the interface circuit 10 cyclically changes the input signal S1n to be output to the reference circuit B1 for each of the frames FR0 to FR5 in the order of the input signal S11→S12→S13→S11→ . . . over time. This enables the determination circuit 40 of the present embodiment to complete the abnormality determination performed for all of the three processing circuits A11 to A13 in a time period TA2 (e.g., 100 millisecond) corresponding to three frames. That is, the determination circuit 40 performs the abnormality determination while changing the determination target circuit for each of the frames FR0 to FR5, and thereby, it is possible to detect an anomaly in each processing circuit A1 before the time period TA2 which is prescribed elapses.

When the input signals S11, S12, S13, and S1n are respectively input to the processing circuits A11, A12, and A13 and the reference circuit B1, the processing circuits A11, A12, and A13 and the reference circuit B1 subject the input signals to video signal processes (ST3 in FIG. 3).

At this time, the pieces of image data S21, S22, and S23 after the signal processing performed respectively by the processing circuits A11, A12, and A13 are output via the outputter 25 to the HDR rendering circuit 31. The HDR rendering circuit 31 outputs the image data S31 synthesized by combining the pieces of image data S21, S22, and S23 to the host system 3 and the determination circuit 40. This enables the sensor system 100 to output the image data S31 synthesized by the HDR rendering circuit 31 in each frame to the host system 3 and enables the host system 3 to use the image data S31 received from the sensor system 100 for control or the like of the automobile 300.

Moreover, in the frame FR0, the input signal S11 input to the processing circuit A11 serving as the determination target circuit in the frame FR0 is input to the reference circuit B1 as the input signal S1n. In the frame FR0, the control circuit 50 of the processing system 1 sets, in the reference circuit B1, the same parameters as the parameters set in the processing circuit A11 serving as the determination target circuit, and the reference circuit B1 performs the same signal processing on the input signal S11 as the signal processing performed by the processing circuit A11. Then, in the frame FR0, the control circuit 50 of the processing system 1 causes the outputter 25 to output, to the HDR rendering circuit 32, the pieces of image data SG1 and SG2 which are the pieces of image data S22 and S23 respectively of the processing circuits A12 and A13 and the image data S2n of the reference circuit B1. The HDR rendering circuit 32 outputs the image data S32 synthesized by combining the pieces of image data S22, S23, and S2n to the determination circuit 40.

In the frame FR0, when receiving the pieces of image data S31 and S32 respectively from the HDR rendering circuits 31 and 32, the determination circuit 40 performs a comparison between the pieces of image data S31 and S32 to perform the abnormality determination to determine whether or not the processing circuit A11 serving as the determination target circuit has an abnormality (ST4 in FIG. 3). The determination circuit 40 compares values of pixels between the pieces of image data S31 and S32. When at least one value of the pixels is different between the pieces of image data S31 and S32, the determination circuit 40 determines that the determination target circuit (in the frame FR0, the processing circuit A11) is abnormal, and the determination circuit 40 outputs the determination result to the host system 3. This enables the host system 3 to grasp the abnormality in the circuit 20 of the processing system 1. In contrast, when all the values of the pixels are the same between the pieces of image data S31 and S32, the determination circuit 40 determines that the determination target circuit (in the frame FR0, the processing circuit A11) is normal.

Next, the control circuit 50 of the processing system 1 determines whether or not the abnormality determination is performed on all of the processing circuits A11 to A13, in other words, whether or not the abnormality determination is cycled through once the three processing circuits A11 to A13 (ST5 in FIG. 3).

Here, if it is determined in step ST5 that the abnormality determination is not cycled through once the three processing circuits A11 to A13 (ST5: No), the control circuit 50 of the processing system 1 changes the determination target circuit (ST6 in FIG. 3) and repeats the process from steps ST1 to ST5. For example, when the abnormality determination in the frame FR0 ends, the control circuit 50 of the processing system 1 sets up the processing circuit A12 to serve as the determination target circuit in the frame FR1, and the control circuit 50 performs the process of ST1 to ST5 to perform the abnormality determination to determine whether or not the processing circuit A12 has an abnormality. Moreover, when the abnormality determination in the frame FR1 ends, the control circuit 50 of the processing system 1 sets up the processing circuit A13 to serve as the determination target circuit in the frame FR2, and the control circuit 50 performs the process of ST1 to ST5 to perform the abnormality determination to determine whether or not the processing circuit A13 has an abnormality.

In contrast, when it is determined in step ST5 that the abnormality determination is cycled through once the three processing circuits A11 to A13 (ST5: Yes), the control circuit 50 of the processing system 1 terminates the abnormality determination in one time period TA2. Here, when the determination circuit 40 determines that all of the three processing circuits A11 to A13 are abnormal at the completion of the abnormality determination cycled through once the three processing circuits A11 to A13, the determination circuit 40 determines that the reference circuit B1, but not the processing circuits A11 to A13, is abnormal. Then, the determination circuit 40 outputs the determination result of the abnormality to the host system 3. Then, when a next frame starts, the control circuit 50 of the processing system 1 restarts the abnormality determination process on the three processing circuits A11 to A13 and repeats the abnormality determination process on the three processing circuits A11 to A13 to enable continuous monitoring of the presence or absence of an anomaly in each processing circuit A1.

As described above, the determination circuit 40 performs the abnormality determination for each of the three processing circuits A11 to A13. In the processing system 1 of the present embodiment, the determination target circuit is changed so that the abnormality determination is not performed a plurality of times on an identical processing circuit A1 while the determination circuit 40 performs the abnormality determination for all of the two or more processing circuits A1 (in the present embodiment, the three processing circuits A11 to A13). Specifically, the control circuit 50 of the processing system 1 changes the determination target circuit by changing parameters set in the reference circuit B1 and the input signal S1$n$ to the reference circuit B1 so that the abnormality determination is not performed a plurality of times on an identical processing circuit A1 while the determination circuit 40 performs the abnormality determination for all of the two or more processing circuits A1. This enables the processing system 1 to subject all of the three processing circuits A11 to A13 to the abnormality determination in three frames, thereby reducing time required to perform the abnormality determination for all of the processing circuits A11 to A13. In other words, the processing system 1 enables time until detection of the occurrence of an abnormality in each of the processing circuits A11 to A13 to be reduced. Note that the determination circuit 40 changes the determination target circuit among the three processing circuits A11 to A13 over time in a prescribed order, but the determination target circuit may be randomly changed.

Moreover, the determination circuit 40 may change the determination target circuit such that the abnormality determination is performed twice or more on a particular processing circuit A1 until the abnormality determination performed for all of the three processing circuits A11 to A13 is completed. For example, the control circuit 50 of the processing system 1 may change the determination target circuit such that a processing circuit A1 of higher importance is more frequently subjected to the abnormality determination so that detection of an abnormality in the processing circuit A1 of higher importance is possible at an early time point.

As described above, in the processing system 1 of the present embodiment, the determination circuit 40 continuously monitors the presence or absence of an anomaly in each of the plurality of processing circuits A1 that process the input signals S1 from the sensor 2. Here, in the processing system 1, when the determination circuit 40 determines that one or more of the two or more processing circuits A1 are abnormal, one or more remaining processing circuits A1 of the two or more processing circuits A1 subject the input signal S1 to the signal processing. In the present embodiment, the number of the processing circuits A1 is three, and when any of the processing circuits A1 is abnormal, the number of the remaining processing circuits A1 is two, and therefore, the number of input signals from the sensor 2 which are processable by the processing circuits A1 decreases by one. Thus, the control circuit 50 of the processing system 1 performs the signal processing by the remaining processing circuits A1 on two (e.g., the input signals S11 and S12) of the three input signals S11, S12, and S13 from the sensor 2 to continue its operation.

Figure 5:
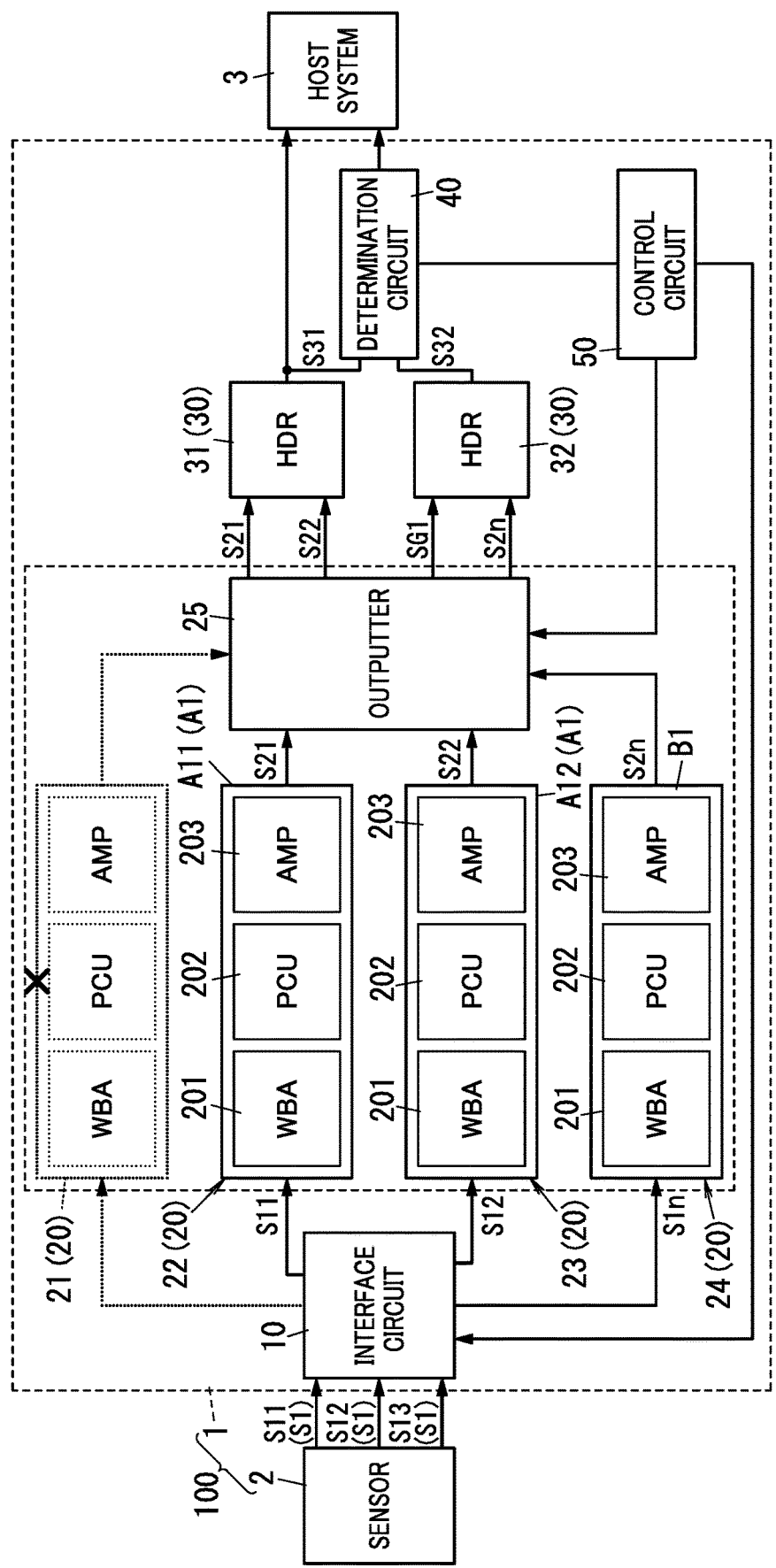
FIG. 5 is a block diagram illustrating a state where one circuit in the processing system is in failure.

For example, when the determination circuit 40 determines that the circuit 21 used as the processing circuit A11 is abnormal, the control circuit 50 of the processing system 1 sets up the circuits 22 and 23 to serve as the processing circuits A11 and A12 respectively as illustrated in FIG. 5.

The control circuit 50 sets parameters corresponding to the input signal S11 in the circuit 22 and sets parameters corresponding to the input signal S12 in the circuit 23. Moreover, the control circuit 50 controls the interface circuit 10 to cause the interface circuit 10 to receive the input signal S11 from the sensor 2 and output the input signal S11 to the processing circuit A11 using the circuit 22, and to receive the input signal S12 from the sensor 2 and output the input signal S12 to the processing circuit A12 using the circuit 23 (see FIG. 6). The outputter 25 outputs the pieces of image data S21 and S22 respectively generated by the processing circuits A11 and A12 to the HDR rendering circuit 31. The HDR rendering circuit 31 combines the pieces of image data S21 and S22 input via the outputter 25 respectively from the processing circuits A11 and A12 to synthesize the image data S31 and outputs the image data S31 to the host system 3 and the determination circuit 40.

Figure 6:
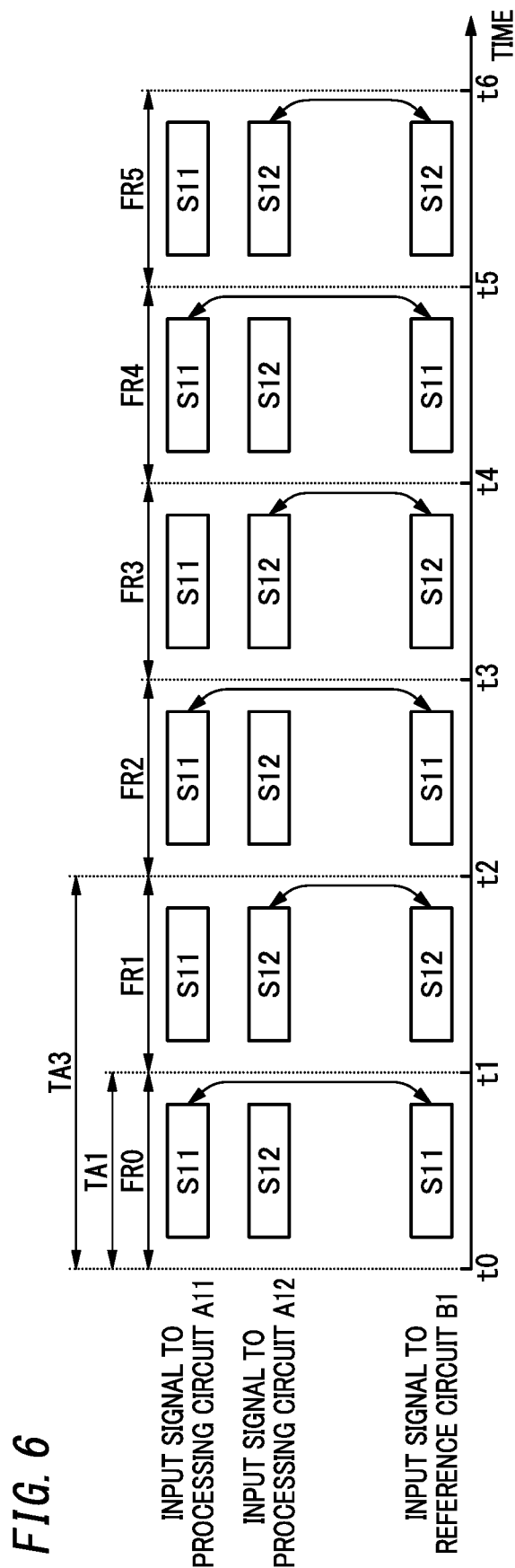
FIG. 6 is a timing chart illustrating operation in a case where one circuit in the processing system is in failure.

Moreover, the control circuit 50 controls the interface circuit 10 to cause the interface circuit 10 to output an input signal, which is the same as the input signal output to the determination target circuit, to the reference circuit B1 as the input signal S1$n$ in each frame (see FIG. 6). The outputter 25 outputs, to the HDR rendering circuit 32, the image data SG1 from the processing circuit which is one of the processing circuits A11 and A12 and which is other than the determination target circuit and the image data S2$n$ from the reference circuit B1. The HDR rendering circuit 32 combines the pieces of image data S2$n$ and SG1 to synthesize the image data S32 and outputs the image data S32 to the determination circuit 40.

Then, the determination circuit 40 compares the pieces of image data S31 and S32 of the HDR rendering circuits 31 and 32 with each other to determine the presence or absence of an abnormality in the determination target circuit. This enables the determination circuit 40 to complete the abnormality determination performed for all of the two processing circuits A11 and A12 in time period TA3 corresponding to two frames. Thus, even when one or more of the plurality of circuits 20 are abnormal, if at least three circuits 20 are normal, the processing system 1 can set up one of the three circuit 20 as the reference circuit B1 and set up remaining two circuits as the processing circuits A1 so as to continue its operation.

In this embodiment, when the determination circuit 40 determines that one or more processing circuits A1 of the two or more processing circuits A1 are abnormal, the interface circuit 10 outputs one or more input signals S1, which would otherwise be output to the one or more processing circuits A1, to remaining one or more processing circuits A1 of the two or more processing circuits A1. For example, when the determination circuit 40 determines that the processing circuit A11 which is the circuit 21 is abnormal, the control circuit 50 of the processing system 1 controls the interface circuit 10 to output the input signal S11, which would otherwise be input to the processing circuit A11 determined to be abnormal, to the remaining circuit 22. In this way, the one or more input signals S1, which would otherwise be subjected to the signal processing by the one or more processing circuits A1 determined to be abnormal, are processable by the remaining one or more processing circuits A1.

Note that when the determination circuit 40 determines that the one or more processing circuits A1 of the two or more processing circuits A1 are abnormal, the interface circuit 10 does not have to output the input signal S11, which would otherwise be output to the processing circuit A1 determined to be abnormal, to another circuit 20. For example, when the determination circuit 40 determines that the processing circuit A13 which is the circuit 23 is abnormal, the interface circuit 10 does not have to change the input signals S11 and S12 to be input to the remaining processing circuits A11 and A12. In this case, the remaining two processing circuits A11 and A12 can continuously subject the input signals S11 and S12 to the signal processing.

Moreover, in the processing system 1, when the determination circuit 40 determines that the reference circuit B1 is abnormal, the reference circuit B1 is changed to any of the plurality of circuits 20. Specifically, when the determination circuit 40 determines that the reference circuit B1 is abnormal, the control circuit 50 of the processing system 1 changes the reference circuit B1 to a circuit 20 of the plurality of circuits 20 which is not determined to be abnormal. For example, when the determination circuit 40 determines that the circuit 24 used as the reference circuit B1 is abnormal, the control circuit 50 of the processing system 1 sets up any circuit, but other than the circuit 24 determined to be abnormal, of the plurality of circuits 21 to 24 to serve as the reference circuit B1. For example, when the determination circuit 40 sets up the circuit 23 to serve as the reference circuit B1, the number of processing circuits A1 decreases by one, but in the processing system 1, the circuits 21 and 22 are used as the processing circuits A11 and A12 and are caused to subject the input signals S11 and S12 from the sensor 2 to the signal processing, and thereby, operation is continued.

Incidentally, in the present embodiment, the interface circuit 10 changes the input signal input to the reference circuit B1 at time intervals according to time intervals at which the determination target circuit is changed. In other words, the control circuit 50 of the processing system 1 controls the interface circuit 10 to change the time intervals at which the input signal input to the reference circuit B1 in accordance with the time intervals at which the determination target circuit is changed. For example, the control circuit 50 of the processing system 1 may set, in accordance with the number of input signals S1, the time intervals at which the determination target circuit is changed. The control circuit 50 of the processing system 1 sets the time intervals, at which the determination target circuit is changed, such that the abnormality determination can be performed on all of the processing circuits A1 in the time period TA2 which is prescribed. Thus, the control circuit 50 of the processing system 1 sets the time intervals at which the determination target circuit is changed, and thereby, it is possible to adjust time until completion of the abnormality determination performed on all of the two or more processing circuits A1.

(3) Variation

The embodiment is a mere example of various embodiments of the present disclosure. Various modifications may be made to the embodiment depending on design and the like as long as the object of the present disclosure can be achieved.

Moreover, functions similar to those of the processing system 1 and the sensor system 100 may be realized by an abnormality determination method, a computer program, or a non-transitory recording medium or the like in which program is stored. An abnormality determination method of one aspect includes setting up two or more circuits 20 of a plurality of circuits 20 to serve as two or more processing circuits A1. Each of the plurality of circuits 20 is configured to receive an input signal S1 from a sensor 2. Each of the two or more processing circuits A1 is configured to subject the input signal S1 to signal processing. Moreover, the abnormality determination method includes setting up one or more circuits 20 of the plurality of circuits 20 to serve as reference circuits B1. The one or more circuits B1 are circuits other than the two or more processing circuits A1 and are smaller in number than the two or more processing circuits A1. Furthermore, the abnormality determination method includes performing abnormality determination for a determination target circuit which is any one of the two or more processing circuits A1 based on a comparison result between an output signal of the determination target circuit and each of output signals of the reference circuits B1. A non-transitory storage medium according to one aspect is a non-transitory storage medium in which a program is stored, the program being configured to cause a computer system to execute the abnormality determination method.

Variations of the embodiment will be described below. Note that any of the variations to be described below may be combined as appropriate.

The processing system 1 and the sensor system 100 of the present disclosure includes a computer system. The computer system includes a processor and memory as main hardware components. The processor execute a program stored in the memory of the computer system, thereby realizing the functions as the processing system 1 and the sensor system 100 of the present disclosure. The program may be stored in the memory of the computer system in advance, provided via telecommunications network, or provided as a non-transitory recording medium such as a computer system-readable memory card, optical disc, or hard disk drive storing the program. The processor of the computer system includes one or a plurality of electronic circuits including semiconductor integrated circuits (IC) or large-scale integrated circuits (LSI). The integrated circuit such as IC or LSI mentioned herein may be referred to in another way, depending on the degree of the integration and includes integrated circuits called system LSI, very-large-scale integration (VLSI), or ultra-large-scale integration (ULSI). A field-programmable gate array (FPGA), which is programmable after fabrication of the LSI, or a logical device which allows reconfiguration of connections in LSI or reconfiguration of circuit cells in LSI may be adopted as the processor. Those electronic circuits may be either integrated together on a single chip or distributed on multiple chips without limitation. The plurality of chips may be collected in one device or may be distributed in a plurality of devices. As mentioned herein, the computer system includes a microcontroller including one or more processors and one or more memories. Thus, the microcontroller is also composed of one or more electronic circuits including a semiconductor integrated circuit or a large-scale integrated circuit.

Moreover, collecting the plurality of functions of the processing system 1 in one housing is not an essential configuration of the processing system 1. The components of the processing system 1 may be distributed in a plurality of housings. Similarly, collecting the plurality of functions of the sensor system 100 in one housing is not an essential configuration of the sensor system 100. The components of the sensor system 100 may be distributed in a plurality of housings. For example, the processing system 1 and the sensor 2 may be distributed in a plurality of housings. Moreover, at least some functions of the processing system 1 and the sensor system 100, for example, some functions of the processing circuit A1, the reference circuit B1, and the determination circuit 40 may be realized by cloud (cloud computing) or the like.

In the embodiment described above, the number of circuits 20 to which input signals from the sensor 2 is four, but the number of circuits 20 is not limited to four. For example, when the number of input signals S1 from the sensor 2 is n (n is a positive integer), the number of circuits 20 is at least larger than or equal to (n+1).

In the embodiment described above, the number of reference circuit B1 is one, but the number of the reference circuits B1 is not limited to one. The number of reference circuits B1 may be two or more as long as it is smaller than the number of processing circuits A1. When the number of reference circuits B1 is two or more, it is possible to concurrently subject different determination target circuits to abnormality determination by using the two or more reference circuits B1, and it is thus possible to reduce time required to complete the abnormality determination performed for all of the plurality of processing circuits A1. Thus, the processing system 1 enables time until detection of an abnormality in each of the processing circuits A1 to be reduced.

In the embodiment described above, the plurality of input signals S1 input to the interface circuit 10 are signals with different exposure times and input from one sensor 2, but the input signals S1 input to the interface circuit 10 are not limited to signals with different exposure times.

For example, the plurality of input signals S1 input to the interface circuit 10 may be signals input from a plurality of sensors 2. For example, the plurality of input signals S1 may include a plurality of pieces of image data input from a plurality of image sensors. The interface circuit 10 outputs the image data input from each of the plurality of image sensors to a corresponding circuit 20 of the plurality of circuits 20. For example, the plurality of circuits 20 process, in synchrony with each other, the respective pieces of image data input. Moreover, an input signal the same as the input signal input to the circuit 20 serving as the determination target circuit is input to the circuit 24 serving as the reference circuit B1, and the reference circuit B1 performs the same process as the process performed by the determination target circuit. This enables the determination circuit 40 to perform abnormality determination to determine whether or not the determination target circuit has an abnormality based on the comparison result between the output signal of the circuit 20 serving as the determination target circuit and the output signal of the circuit 24 serving as the reference circuit B1.

Moreover, the sensor 2 is not limited to the image sensor but may be, for example, an object detection sensor such as a Doppler radar, an ultrasonic wave sensor, and Light Detection and Ranging (LiDAR). The plurality of input signals S1 from the plurality of sensors are input to the interface circuit 10, and the plurality of circuits 20 subject the input signals to the same processes. An input signal the same as the input signal input to the circuit 20 serving as the determination target circuit is input to the circuit 24 serving as the reference circuit B1, and the reference circuit B1 performs the same process as the process performed by the determination target circuit. This enables the determination circuit 40 to perform abnormality determination to determine whether or not the determination target circuit has an abnormality based on the comparison result between the output signal of the circuit 20 serving as the determination target circuit and the output signal of the circuit 24 serving as the reference circuit B1.

(Summary)

As described above, a processing system (1) of a first aspect includes a plurality of circuits (20) each configured to receive an input signal (S1) from a sensor (2); and a determination circuit (40). The processing system (1) is configured to set up two or more circuits (20) of the plurality of circuits (20) to serve as two or more processing circuits (A1) each configured to subject the input signal (S1) to signal processing. The processing system (1) is configured to set up at least one circuit (20) of the plurality of circuits (20) to serve as a reference circuit (B1). The at least one circuit (20) is smaller in number than the two or more processing circuits (A1) and is other than the two or more processing circuits (A1). The determination circuit (40) is configured to, based on a comparison result between an output signal of the determination target circuit and an output signal of the reference circuit (B1), perform abnormality determination to determine whether or not a determination target circuit has an abnormality. The determination target circuit is any one of the two or more processing circuits (A1).

This aspect provides a processing system (1) configured to monitor the presence or absence of a failure while enlargement of a circuit scale is suppressed.

In a processing system (1) of a second aspect referring the output timing first aspect, the plurality of circuits (20) have same circuit configurations.

This aspect enables abnormality determination to be performed on the plurality of circuits (20) having the same circuit configurations.

In a processing system (1) of a third aspect referring the output timing first or second aspect, the determination target circuit which is subjected to the abnormality determination performed by the determination circuit (40) is changed from one processing circuit of the two or more processing circuits (A1) to another processing circuit of the two or more processing circuits (A1) over time.

With this aspect, changing the determination target circuit between the two or more processing circuits (A1) over time reduces the number of reference circuits (B1).

In a processing system (1) of a fourth aspect referring the output timing third aspect, a parameter regarding the signal processing on the input signal (S1) is set in each of the plurality of circuits (20). The determination target circuit is changed in accordance with a change in the parameter set in the reference circuit (B1).

With this aspect, changing the parameter set in the reference circuit (B1) enables the determination target circuit to be changed.

A processing system (1) of a fifth aspect referring the output timing third or fourth aspect further includes an interface circuit (10) configured to receive the input signal (S1) from the sensor (2) and output the input signal (S1) to each of the plurality of circuits (20). The interface circuit (10) is configured to output, to the reference circuit (B1), an input signal (S1) a same as the input signal (S1) output to the determination target circuit.

With this aspect, the interface circuit (10) outputs, to the reference circuit (B1), an input signals (S1) the same as the input signal input to the determination target circuit, which enables abnormality determination to be performed based on a comparison result between the output signal of the determination target circuit and the output signal of the reference circuits (B1).

In a processing system (1) of a fifth aspect referring the output timing sixth aspect, the interface circuit (10) is configured to change the input signal (S1) to be input to the reference circuit (B1) at time intervals according to time intervals at which the determination target circuit is changed.

This aspect enables the time intervals at which the determination target circuit is changed to be adjusted in accordance with the time intervals at which the input signals (S1) to be input to the reference circuit (B1) are changed.

In a processing system (1) of a seventh aspect referring to any one of the third to sixth aspects, the determination target circuit is changed to avoid a plurality of times of the abnormality determination performed for an identical processing circuit (A1) of the two or more processing circuits while the determination circuit (40) performs the abnormality determination for all of the two or more processing circuits (A1).

With this aspect, it is possible to adjust the time until the abnormality determination is completed for all of the two or more processing circuits (A1).

In a processing system (1) of an eighth aspect referring to any one of the first to seventh aspects, the input signal (S1) includes image data.

This aspect enables the processing system (1) for processing image data to monitor the presence or absence of a failure while enlargement of a circuit scale is suppressed.

In a processing system (1) of a ninth aspect referring the eighth aspect, two or more of the input signals (S1) each input to a corresponding one of the respective two or more processing circuits (A1) include pieces of image data with different exposure times. The processing system (1) further includes a synthesizing circuit (30) configured to combine output signals output from the two or more processing circuits (A1).

With this aspect, combining the pieces of image data with different exposure times with each other enables image data with increased dynamic range as compared to the individual pieces of image data to be synthesized.

In a processing system (1) of a tenth aspect referring to any one of the first to ninth aspects, when the determination circuit (40) determines that at least one processing circuit of the two or more processing circuits (A1) is abnormal, a predetermined process is performed. In the predetermined process, at least one remaining processing circuit (A1) of the two or more processing circuits (A1) performs the signal processing on the input signal (S1).

With this aspect, even when one or more of the two or more processing circuits (A1) are abnormal, signal processing on the input signal (S1) is continuously performed by the remaining processing circuit(s) (A1).

In a processing system (1) of an eleventh aspect referring the tenth aspect, an interface circuit (10) configured to receive the input signal (S1) from the sensor (2) and output the input signal (S1) to each of the plurality of circuits (20). With this aspect, when the determination circuit (40) determines that the at least one processing circuit (A1) of the two or more processing circuits (A1) is abnormal, the interface circuit (10) outputs the input signal (S1), which is to be output to the at least one processing circuit (A1), to the at least one remaining processing circuit of the two or more processing circuits (A1).

With this aspect, even when one or more of the two or more processing circuits (A1) are abnormal, signal processing on the input signal (S1) is continuously performed by the remaining processing circuit(s) (A1).

In a processing system (1) of a twelfth aspect referring to the tenth or eleventh aspect, when the determination circuit (40) determines that the reference circuit (B1) is abnormal, the reference circuit (B1) is changed to any of the plurality of circuits (20).

With this aspect, even in a case where it is determined that the reference circuit (B1) is abnormal, changing the reference circuit (B1) enables abnormality determination for the processing circuits (A1) to be continuously performed.

A sensor system (100) of a thirteenth aspect includes: the processing system (1) of any one of the first to twelfth aspects; and the sensor (2).

This aspect provides a sensor system (100) including the processing system (1) configured to monitor the presence or absence of a failure while enlargement of a circuit scale is suppressed.

A mobile object (300) of a fourteenth aspect includes the sensor system (100) of the thirteenth aspect, and a mobile object body (301) on which the sensor system (100) is provided.

This aspect provides a mobile object (300) provided with the sensor system (100) configured to monitor the presence or absence of a failure while enlargement of a circuit scale is suppressed.

An abnormality determination method of a fifteenth aspect includes setting up two or more circuits (20) of a plurality of circuits (20) to serve as two or more processing circuits (A1). Each of the plurality of circuits (20) is configured to receive an input signal (S1) from a sensor (2). Each of the two or more processing circuits (A1) is configured to subject the input signal (S1) to signal processing. The abnormality determination method includes setting up at least one circuit (20) of the plurality of circuits (20) to serve as a reference circuit (B1). The at least one circuit (20) is other than the two or more processing circuits (A1) and is smaller in number than the two or more processing circuits (A1). The abnormality determination method includes performing abnormality determination to determine, based on a comparison result between an output signal of the determination target circuit and an output signal of the reference circuit (B1), whether or not a determination target circuit has an abnormality, the determination target circuit being any one of the two or more processing circuits (A1).

This aspect provides an abnormality determination method configured to monitor circuits for a failure while a circuit scale is suppressed from increasing.

A non-transitory storage medium of a sixteenth aspect is a non-transitory storage medium in which a program is stored, the program being configured to cause a computer system to execute the abnormality determination method of the fifteenth aspect.

This aspect provides a non-transitory storage medium storing a program configured to monitor the presence or absence of a failure while enlargement of a circuit scale is suppressed.

The aspects should not be construed as limiting, but various configurations (including variations) of the processing system (1) or the sensor system (100) of the embodiment are realizable by, for example, an abnormality determination method, a (computer) program, or a non-transitory recording medium in which a program is stored.

The configurations according to the second to twelfth aspects are not configurations essential for the processing system (1) and may thus be accordingly omitted.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. A processing system, comprising:
a plurality of circuits having a same circuit configuration, each of the plurality of circuits being configured to receive an input signal from a sensor;
a determination circuit; and
a synthesizing circuit, wherein
the processing system is configured to set up two or more circuits of the plurality of circuits to serve as two or more processing circuits, each of the two or more processing circuits being configured to subject the input signal to signal processing,
two or more input signals, each being input to a corresponding one of the two or more processing circuits, include pieces of image data with different exposure times,
the synthesizing circuit is configured to generate a synthesized image by synthesizing output signals output from the two or more processing circuits,
the processing system is configured to set up at least one circuit of the plurality of circuits to serve as a reference circuit, the at least one circuit being smaller in number than the two or more processing circuits and being other than the two or more processing circuits,
a determination target circuit and the reference circuit perform same signal processing on a same input signal, the determination target circuit being one of the two or more processing circuits, and
the determination circuit is configured to, based on a comparison result between an output signal of the determination target circuit and an output signal of the reference circuit, perform abnormality determination to determine whether or not the determination target circuit has an abnormality.

2. The processing system of claim 1, wherein
the determination target circuit which is subjected to the abnormality determination performed by the determination circuit is changed from one processing circuit of the two or more processing circuits to another processing circuit of the two or more processing circuits over time.

3. The processing system of claim 2, wherein
a parameter regarding the signal processing on the input signal is set in each of the plurality of circuits, and
the determination target circuit is changed in accordance with a change in the parameter set in the reference circuit.

4. The processing system of claim 2, further comprising:
an interface circuit configured to receive the input signal from the sensor and output the input signal to each of the plurality of circuits, and the interface circuit is configured to output, to the reference circuit, an input signal same as the input signal output to the determination target circuit.

5. The processing system of claim 4, wherein
the interface circuit is configured to change the input signal to be input to the reference circuit at time intervals according to time intervals at which the determination target circuit is changed.

6. The processing system of claim 2, wherein
the determination target circuit is changed to avoid a plurality of times of the abnormality determination performed for an identical processing circuit of the two or more processing circuits while the determination circuit performs the abnormality determination for all of the two or more processing circuits.

7. The processing system of claim 3, further comprising:
an interface circuit configured to receive the input signal from the sensor and output the input signal to each of the plurality of circuits, and
the interface circuit is configured to output, to the reference circuit, an input signal a same as the input signal output to the determination target circuit.

8. The processing system of claim 3, wherein
the determination target circuit is changed to avoid a plurality of times of the abnormality determination performed for an identical processing circuit of the two or more processing circuits while the determination circuit performs the abnormality determination for all of the two or more processing circuits.

9. A processing system comprising:
a plurality of circuits having a same circuit configuration, each of the plurality of circuits being configured to receive an input signal from a sensor; and
a determination circuit, wherein
the processing system is configured to set up two or more circuits of the plurality of circuits to serve as two or more processing circuits, each of the two or more processing circuits being configured to subject the input signal to signal processing,
the processing system is configured to set up at least one circuit of the plurality of circuits to serve as a reference circuit, the at least one circuit being smaller in number than the two or more processing circuits and being other than the two or more processing circuits,
a determination target circuit and the reference circuit perform same signal processing on a same input signal, the determination target circuit being one of the two or more processing circuits,
the determination circuit is configured to, based on a comparison result between an output signal of the determination target circuit and an output signal of the reference circuit, perform abnormality determination to determine whether or not a determination target circuit has an abnormality,
when the determination circuit determines that at least one processing circuit of the two or more processing circuits is abnormal, at least one remaining processing circuit of the two or more processing circuits performs the signal processing on the input signal,
when the determination circuit determines that the reference circuit is abnormal, the reference circuit is changed to any of the plurality of circuits.

10. The processing system of claim 9, further comprising:
an interface circuit configured to input the input signal from the sensor to each of the plurality of circuits, and
when the determination circuit determines that the at least one processing circuit of the two or more processing circuits is abnormal, the interface circuit outputs the input signal, which is to be output to the at least one processing circuit, to the at least one remaining processing circuit of the two or more processing circuits.

11. A sensor system, comprising:
the processing system of claim 1; and
the sensor.

12. A mobile object, comprising:
the sensor system of claim 11; and
a mobile object body on which the sensor system is provided.

13. An abnormality determination method, comprising:
setting up two or more circuits of a plurality of circuits having a same circuit configuration, to serve as two or more processing circuits, each of the plurality of circuits being configured to receive an input signal from a sensor, each of the two or more processing circuits being configured to subject the input signal to signal processing;
inputting each of two or more input signals to a corresponding one of the two or more processing circuits, the two or more input signals including pieces of image data with different exposure times,
generating a synthesized image by synthesizing output signals output from the two or more processing circuits;
setting up at least one circuit of the plurality of circuits to serve as a reference circuit, the at least one circuit being smaller in number than the two or more processing circuits and being other than the two or more processing circuits;
performing, by a determination target circuit and the reference circuit, same signal processing on a same input signal, the determination target circuit being one of the two or more processing circuits, and
performing abnormality determination to determine, based on a comparison result between an output signal of the determination target circuit and an output signal of the reference circuit, whether or not the determination target circuit has abnormality.

14. A non-transitory storage medium in which a program is stored, the program being configured to cause a computer system to execute the abnormality determination method of claim 13.

* * * * *